UNITED STATES PATENT OFFICE.

L. O. P. MEYER, OF NEWTOWN, CONNECTICUT.

IMPROVEMENT IN PROCESSES OF VULCANIZING CAOUTCHOUC COMPOUNDS.

Specification forming part of Letters Patent No. 10,339, dated December 20, 1853.

*To all whom it may concern:*

Be it known that I, L. OTTO P. MEYER, a native of Hamburg, Germany, but now residing at Newtown, in the State of Connecticut, have invented a certain new and useful Improvement in the Manufacture of Caoutchouc and other Vulcanizable Gums; and I do hereby declare the following to be a full, clear, and exact description thereof.

The nature of my invention consists in producing, by means of oil and other fatty substances, smooth and glossy surfaces upon the material commonly known as the "hard compound of vulcanized caoutchouc," or gutta-percha, or other vulcanizable gums, which may be manufactured according to the processes described in Letters Patent of the United States granted to Chas. Goodyear June 15, 1844, and Nelson Goodyear March 8, 1851. The material, after being prepared and compounded and formed in any well-known way to the required shape, and before heating, is to be laid between sheets, or in molds of tin or other metal. To prevent the formation of bubbles or blisters of air between the metal and the gum I warm the compound of gum slightly and rub its surface with oil or fat, for which purpose either animal or vegetable oils or concrete fats may be used. The oiling prevents the immediate sticking of the material to the metallic or molding surface, and allows the confined air to be rolled or pressed out by the application of pressure to the gum or the plates without difficulty before the oil or other fatty substance combines thoroughly with the material, and sticks or cements the surfaces of the metallic plates or molds to the gums.

Although molds or sheets of different metals or glassy surfaces may be used, I prefer tin to any other material, and next to tin I prefer sheet iron and steel rubbed with oil. Glass, although imparting a fine shiny surface, is more expensive and less easy to manage; but articles requiring a very glossy appearance I lay on or between plates of glass under oil, by which means the oil is thoroughly applied and the air completely expelled. The material, being prepared as described and placed on or between plates or in molds, can be put in the heater or oven and be heated or cured without any covering and without pressure.

What I claim as my invention, and desire to secure by Letters Patent, is—

The producing of smooth and glossy surfaces upon the hard compound of caoutchouc and other vulcanizable gums by means of the use of oil or other equivalent substance applied to the surface of the prepared gum and between the gum and the plates of metal or the molds, substantially as herein described.

L. OTTO P. MEYER.

Witnesses:
 C. POPPENHEISER,
 WM. H. BISHOP.